United States Patent [19]

Kunsman

[11] Patent Number: 4,461,498
[45] Date of Patent: Jul. 24, 1984

[54] COUPLING MEMBERS FOR PIPELINE ASSEMBLIES

[75] Inventor: Donald R. Kunsman, Easton, Pa.

[73] Assignee: Victaulic Company of America, South Plainfield, N.J.

[21] Appl. No.: 326,499

[22] Filed: Dec. 2, 1981

[51] Int. Cl.³ .............. F16L 55/00; F16L 9/14; F16L 43/00
[52] U.S. Cl. .............................. 285/16; 285/55; 285/179; 285/373; 285/112
[58] Field of Search .............. 285/16, 179, 373, 419, 285/112, 55

[56] References Cited

U.S. PATENT DOCUMENTS

| | | | |
|---|---|---|---|
| 1,211,784 | 1/1917 | Stuart | 285/16 X |
| 1,246,189 | 11/1917 | Vanderlip | 285/16 |
| 2,225,208 | 12/1940 | Crickmer | 285/373 X |
| 2,412,394 | 12/1946 | Giles | 285/373 X |
| 3,551,006 | 12/1970 | James | 285/16 |
| 3,851,901 | 12/1974 | Gills | 285/373 X |
| 3,920,270 | 11/1975 | Babb | 285/179 X |
| 4,045,060 | 8/1977 | Daigle | 285/373 X |
| 4,130,300 | 12/1978 | Pheridan | 285/179 X |

FOREIGN PATENT DOCUMENTS

| | | | |
|---|---|---|---|
| 1133404 | 10/1982 | Canada | 285/179 |
| 508963 | 10/1930 | Fed. Rep. of Germany | 285/16 |

*Primary Examiner*—Richard J. Scanlan, Jr.
*Attorney, Agent, or Firm*—Abelman, Frayne, Rezac & Schwab

[57] ABSTRACT

According to the present invention, a coupling member assembly is provided which is of multiple-part construction, and which includes an inexpensive and readily replaceable conduit member formed from an abrasion resistant material, the conduit member being supported substantially throughout its entire outer surface by two or more rigid coupling member sections which are bolted or otherwise secured to each other, and, which provide the major structural strength of the coupling member assembly.

10 Claims, 5 Drawing Figures

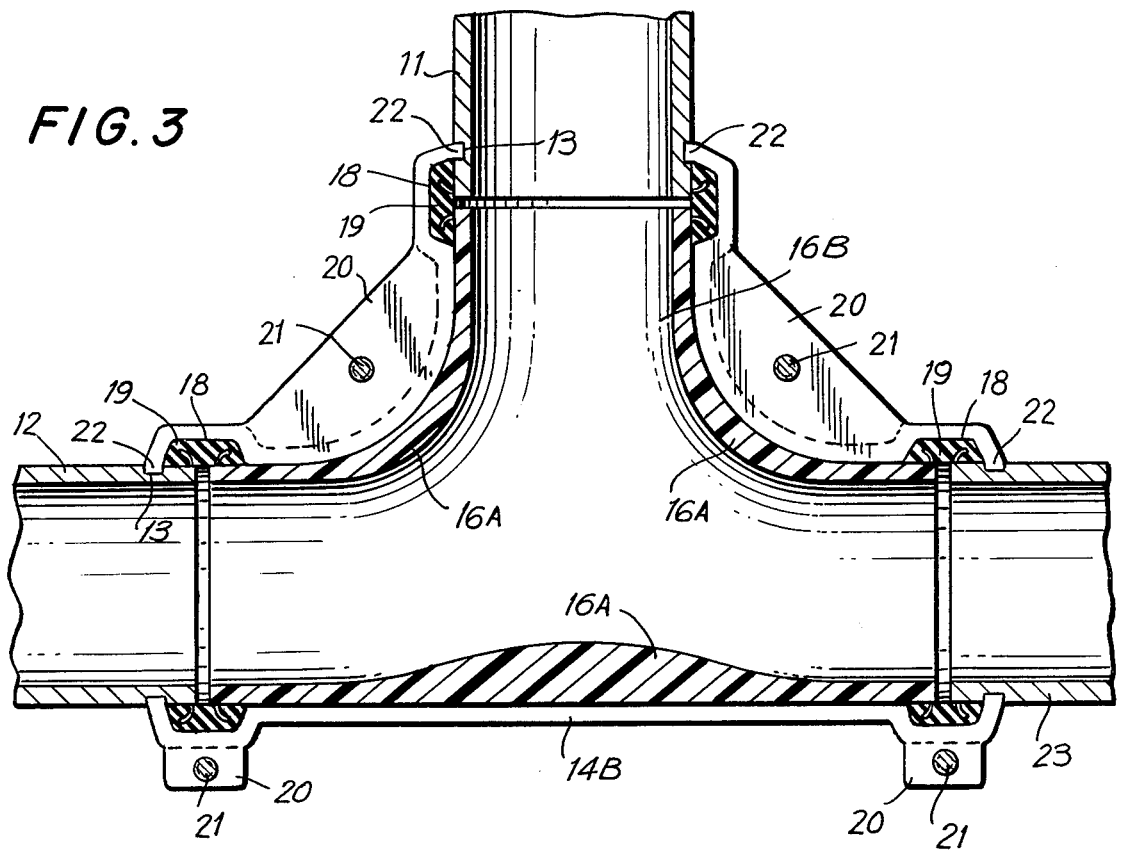
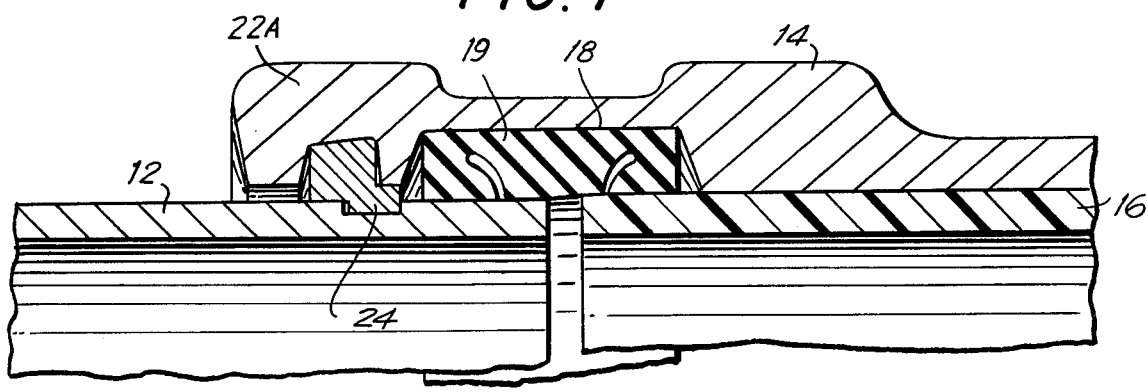
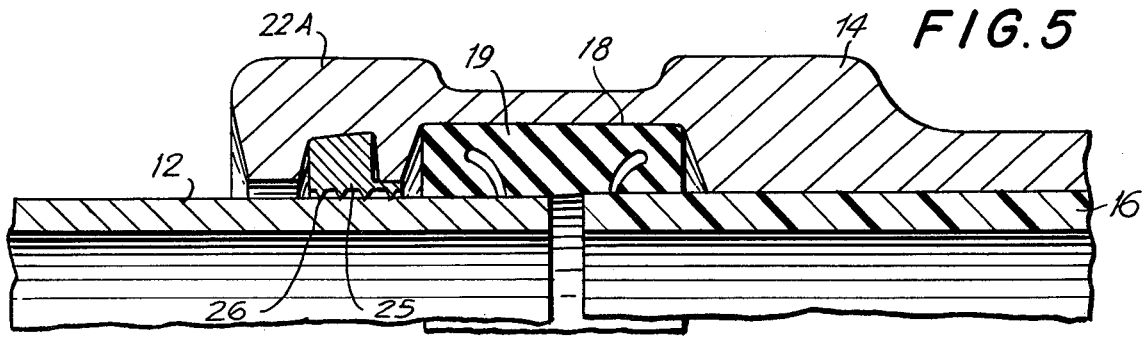

COUPLING MEMBERS FOR PIPELINE ASSEMBLIES

This invention relates to coupling members for pipes, and particularly relates to coupling members for pipeline assemblies used for conveying pneumatic or hydraulic fluids under pressure. While not limited thereto, the invention of the present application finds particular utility in pressurized pneumatic or hydraulic pipeline assemblies used for conveying abrasive particulate material either as an airborne suspension, or, as a slurry of particulate material in a hydraulic medium such as water.

In such pipeline assemblies employed for conveying a suspension or slurry of abrasive particulate materials, particular problems arise where the pipeline must deviate from an axially straight condition, such as at an elbow, tee connection, lateral connection or the like. Deviation from an axially straight condition results in scouring or abrading of the bore of the coupling member and eventually break down of the coupling member by abrasion completely through the body thereof. This problem is particularly acute in pipeline assemblies used for conveying highly abrasive particulate materials, such as bottom ash, particulate slag, sand, powdered coal, powdered coke and the like.

This problem of scouring or abrading of the bore is well known in the art, and is particularly troublesome in coupling members made from ferrous materials such as carbon steel, cast or ductile iron, or coupling members formed from surface hardened iron or steel. Eventual abrading through of such coupling members is extremely hazardous, in that workmen in the vicinity can suddenly be exposed to high pressure streams of possibly noxious fluids and entrained particulate matter, which may be at an elevated temperature.

In an attempt to overcome this problem, resort has been made to coupling members formed from an abrasion resistant elastomeric material, such as polyurethane. However, the use of such elastomeric materials, while reducing the rapidity of abrasion of the coupling members, gives rise to other and equally troublesome problems.

In particular, special adhesives must be employed for connecting the coupling to the respective pipes, such adhesives having a long curing time, and thus protracting the time during which the pipeline assembly must be closed down for removal and replacement of a worn coupling member. Additionally, polyurethane and other elastomeric materials have a high percentage of elongation, which can give rise to ballooning or circumferential expansion of the coupling member, particularly at thin sections of the coupling member which have been decreased in wall thickness by abrasion. Ultimately, rupture will occur at the abraded thin sections, with consequential hazard to workmen in the vicinity of the coupling member.

Additionally, polyurethane and other suitable elastomeric materials have a much lower tensile strength than that of the pipes to be joined by the coupling member, this resulting in a much weaker joint than that obtained using metal coupling members, and, requiring a separate coupling element on each end of the pipes to be joined. Alternatively, or additionally, flanged ends must be provided on the coupling member, this resulting in an increase in the cost of such coupling members.

Without regard to whether the coupling members are formed from metal or from an elastomeric material, eventual wear on the coupling member will require that the coupling member be replaced, and, the worn coupling member discarded or returned for scrap, with the expenses attendant thereon.

BACKGROUND OF THE PRIOR ART

It has been proposed in U.S. Pat. Ser. No. 1,964,123, Kaiser, issued June 26, 1934, to form a flanged coupling member in split halves, and, to employ that coupling member to contain a corrosion resistant insert which is spaced inwardly of the coupling member halves to provide a dead-air space, the corrosion resistant insert thus being unsupported by the respective coupling member halves.

Also, it has been prior proposed in U.S. Pat. No. 3,850,459, Blumenkranz, issued Nov. 26, 1974, to reinforce pipe fittings made from plastics materials for the purpose of strengthening the fittings.

Petroczky, U.S. Pat. Ser. No. 3,944,260, issued Mar. 16, 1976, teaches the provision of gaskets at outlets of a central passage defined by coupling member halves for cooperative engagement with pipes to be enclosed by the coupling member halves.

None of these prior patents, however, is in any way concerned with pipeline assemblies for handling abrasive particulate material, and, none of the patents is in any way directed to the problems confronting the present applicant.

OBJECTS OF THE INVENTION

A major object of this invention is to provide a coupling member assembly, which, while maintaining all of the desirable features of a metal coupling member such as is known in the art, will also retain all of the desirable features of a coupling member formed from an elastomeric material such as is also known in the art, while at the same time mitigating or eliminating undesirable features of such coupling members formed from metal or elastomeric material.

A further object of this invention is to provide a coupling member assembly of the quick-connect type, which is readily replaceable, thus minimizing the down-time of the pipeline assembly required for replacement of the coupling member.

A further object of the invention is to provide a coupling member assembly in which wear on the coupling member is restricted to an inexpensive and readily replaceable insert member, which easily can be discarded and replaced after a determined length of time in service, the cost of the wear absorbing insert member being but a minor fraction of the cost of the entire coupling member assembly.

A further object of the invention is to provide a coupling member assembly which eliminates the need to provide separate securing members on each end of the pipes to be connected by the coupling member, and, to provide a coupling member assembly having a strength at least equal to that of the known metal coupling member.

SUMMARY OF THE INVENTION

According to the present invention, a coupling member assembly is provided which is of multiple-part construction, and which includes an inexpensive and readily replaceable conduit member formed from an abrasion resistant material, the conduit member being supported substantially throughout its entire outer surface by two or more rigid coupling member sections which are bolted or otherwise secured to each other, and, which provide the major structural strength of the coupling member assembly.

The replaceable conduit member, which is not required to provide structural strength to the coupling member assembly, may be formed of a material most suited to the intended use of the pipeline assembly, and, which has maximum resistance to abrasion. For example, the conduit member may be formed from an elastomeric material such as polyurethane, natural or synthetic rubber, or, from an abrasion resistant ceramics material. The conduit member may be formed in any convenient manner appropriate to the material employed, for example, by injection molding or slush molding employing a plastisol, the conduit member being a low cost item which is disposed of after it has become worn, and which has the function of isolating the relatively expensive rigid coupling member sections from the abrasive materials conveyed through the coupling.

On the other hand, the rigid coupling member sections, which are isolated by the conduit member from abrasion, are permanent as opposed to being temporary and discardable, and can thus be formed from a suitable high strength metal or other material possessing the required mechanical strength, the cost of the rigid coupling members being miniscule when amortized over the extended and possibly unlimited useful life thereof.

A further aspect of the present invention is the provision on the respective rigid coupling member sections of gasket housing portions which are located at each end of the conduit member to be contained therein, and which bridge the juxtaposed ends of the respective pipes and conduit ends when the coupling member assembly is in a properly assembled condition. In this way, a fluid-tight seal is provided between the conduit member and the associated pipes in the absence of any direct sealing of the conduit ends to the associates pipes.

In those instances in which the coupling member assembly is to be used in a pipeline assembly in which the pipes are provided with locking grooves adjacent their ends, the gasket housing portions are formed for them to extend radially inwardly, and thus interlock with the locking grooves in the pipe ends to provide an entirely self-supporting coupling assembly in the absence of added coupling members.

Another feature of the present invention resides in the selective reinforcement of those areas of the conduit member which are subject to the highest rate of abrasion, thus extending the useful life of the conduit member.

DESCRIPTION OF THE DRAWINGS

The invention will now be described with reference to the accompanying drawings, in which:

FIG. 3 is a longitudinal cross-section through a tee coupling according to the present invention, and;

FIGS. 4 and 5 are fragmentary cross-sections through alternative forms of pipe clamping members according to the present invention.

In FIGS. 1 and 2 of the drawings there are illustrated coupling member assemblies according to the present invention in the form of elbow joints, each of which is indicated generally by the reference number 10. The respective coupling member assemblies are associated with the ends of pipes 11, 12 of a pipeline assembly employed for conveying a suspension of abrasive particulate material in either a liquid or a pneumatic fluid medium. In these embodiments, the pipes 11 and 12 are iron or steel pipes which either have been surface hardened throughout the length of their bore, or, which have been lined or coated with rubber. Each of the pipes 11 and 12 is provided with a groove 13 adjacent its end for the reception of locking members of the coupling member assembly, the pipes 11 and 12 and the coupling member assembly 10 mutually cooperating with each other to provide a rigid and self-supporting structure.

Figure 1:
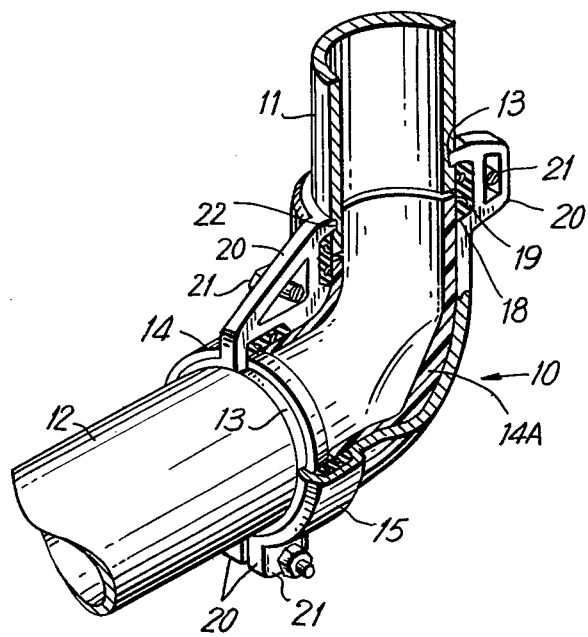
FIG. 1 is a fragmentary perspective view of an elbow coupling according to the present invention.
Figure 2:
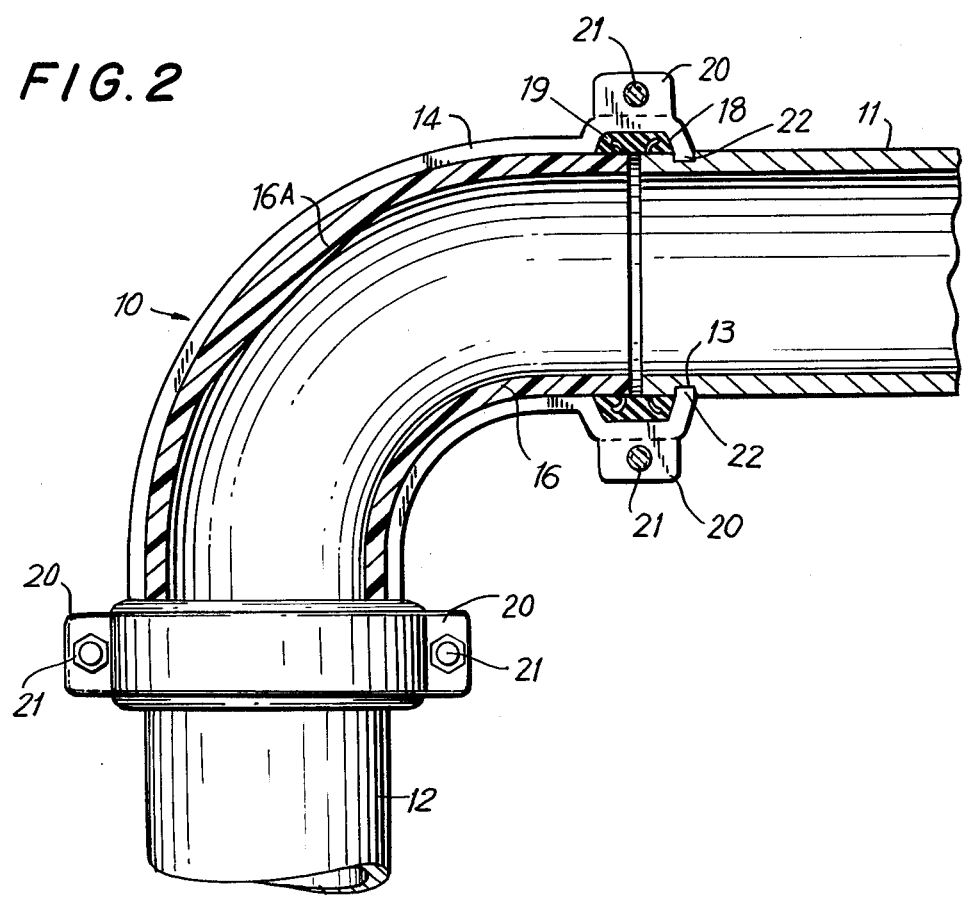
FIG. 2 is a longitudinal cross-section through a modified elbow coupling according to the present invention.

The respective coupling member assemblies of FIGS. 1 and 2 each include two coupling member sections or halves 14 and 15, one of which is substantially a mirror image of the other, the two coupling member halves being assembled in face-to-face relationship for them in combination to provide a split coupling having an internal cylindrical bore in which a conduit member 16 is received.

The coupling member halves 14 and 15 are each formed from a rigid material having substantial mechanical strength, and preferably are castings of a ferrous metal such as cast-iron, or forgings of a malleable iron or steel. Optionally, for certain low-pressure applications the coupling member halves can be formed from a rigid plastics material by a conventional injection molding process, the plastics material preferably being reinforced by included glass, carbon, or metal fibers in order to enhance the strength and dimensional stability thereof, or, the coupling member halves can be formed as die-castings of any suitable metal alloy, in that the resistance to attrition or abrasion of the material forming the coupling member halves is entirely immaterial. Where necessary, the axially and mutually presented faces of the respective coupling member halves are ground or otherwise machined for them to be truly planar, such that when assembled to each other, the coupling member halves will be in continuous face engagement throughout the entire extent of their mutually presented faces. According to the present invention, the respective coupling member halves are isolated from the flow of abrasive particulate material, and thus, it is the strength of the coupling member halves which support and aid in imparting stability to the conduit member 16.

At each of their axial ends, the coupling member halves 14 and 15 are formed with an internal peripheral groove 18 shaped gasket housing section for the reception of a split or a continuous resilient elastomeric sealing member or gasket 19 of any suitable construction, such seals being well known in the art. In the case of a split seal, the respective seal member halves can be installed in the respective coupling member halves and held therein by a suitable adhesive for immediate assembly onto the pipe ends. Alternatively, in the case of a continuous seal, the seal will be assembled onto the mutually presented ends of the conduit member and the pipes prior to assembly of the coupling member halves onto the pipes.

In order to secure the respective coupling member halves to each other, conveniently, and as shown, the coupling member halves each formed with bolting lugs or pads 20, which permit the coupling member halves to be secured to each other by conventional nut and bolt assemblies 21, self-locking nuts preferably being employed in installations where the pipeline assembly is subjected to mechanical vibration, or, is subject to vibration arising from pulsations in the fluid flow. Alternatively, the respective coupling member halves can be secured to each other by convention quick-release toggle couplings, screw bands, or the like, the former being preferred in situations where the coupling members will require frequent replacement.

At each end of their axial ends, the respective coupling member halves 14 and 15 are formed with radially inwardly extending flanges or key sections 22, which conveniently define one wall of the gasket housing sections 18, the flanges or key sections 22 being formed and dimensioned for them to enter into the grooves 13 in the pipe ends, and to hold and secure the pipe ends against movement relatively to each other and relatively to the coupling member assembly.

The conduit member 16, which is contained within the coupling member halves 14 and 15 and which is held and positioned thereby, has axial end portions which preferably are of the same internal and external diameter as that of the associated pipe, thus permitting the use of a single conventional seal or gasket 19 having a transverse cross-section which is symetrical about a central median radial plane. Between its ends, the conduit member may be, and preferably is of increased wall thickness in determined selected areas, and preferably is formed such that it is of major wall thickness at those positions interiorly of the bore which are subject to the maximum attrition or abrasion by the conveyed abrasive particulate material.

As illustrated by the arrows in FIG. 2, maximum attrition or abrasion of the interior bore of the conduit will occur slightly upstream of the change of direction of the fluid flow, due to the centrifugal force exerted on the abrasive particles in negotiating the radius of curvature, and, due to the kinetic energy stored in the particles and which will tend to cause the particles to continue moving on a straight-line path and bombard the interior wall of the conduit member at its outer radius of curvature.

In order to prolong the useful life of the conduit member in service, the conduit member 16 is formed with an increased thickness at the outer radius of the elbow by providing additional material internally of the bore thereof as indicated at 16A in FIGS. 1 and 2. The increase in thickness of the conduit member 16 easily can be provided either during the molding of the conduit member, or, by adding material to the bore of an extruded member comprising the conduit member.

The conduit member, which acts to isolate the respective coupling member halves from the abrasive action of the particulate material, is formed from a material known to have a high resistance to abrasion and attrition upon impaction by the particulate material, and may be formed in any convenient manner, such as by injection molding or extrusion from any suitable elastomeric material or ceramics material. Typically, a high density polyurethane may be employed as the elastomeric material, or, a natural or a synthetic rubber may be employed. Any of those materials may be employed in a substantially pure form, or with inclusions of materials which enhance the abrasion resistance thereof.

In all instances, the outer surface of the conduit member is formed for it to be of a shape complementary to the internal configuration of the assembled coupling member halves, such that, on assembly of the coupling member assembly, the entire outer surface of the conduit member is supported by the coupling member halves, with the exception of the terminal ends of the coupling member, the terminal ends of the coupling member being received within and supported by the seals or gaskets 19. In this manner, the problems of ballooning or circumferential expansion of the relatively inexpensive conduit member are eliminated in their entirety. More importantly, wear by attrition or abrasion of the conduit member bore progresses at a slower rate than that in a conventional metal elbow, while at the same time the wear is confined to the relatively inexpensive and replaceable conduit member in the absence of any wear on the relatively expensive and permanent coupling member halves.

By providing the coupling member halves with integral gasket or seal housings and integral pipe clamping members the requirement for additional gasket or seal housing or clamping members is eliminated in its entirety. Additionally, the conduit member can be formed as a simple tubular extrusion having ends which abut the respective pipes without being directly connected thereto, the coupling member halves acting to hold and position the conduit member in correct orientation relatively to the pipe ends.

Referring now to FIG. 3, there is illustrated a tee coupling member according to the present invention. As will be appreciated the respective arms of the coupling member need not be in the orientation illustrated, but instead may be in the orientation of a Y coupling, and further, the tee branch of the coupling could be duplicated in order to provide a cross-shaped coupling for interconnecting four pipes instead of three pipes.

In FIG. 3 the same reference numerals have been used as those employed in FIGS. 1 and 2 to denote those structures which are common to FIGS. 1, 2 and 3.

In FIG. 3, the coupling member halves 14B and the conduit member 16B are each of tee shape for them to provide connections between pipes 11 and 12 and an additional pipe 23, the coupling member halves being provided with an additional set of bolting lugs 20, an additional gasket or seal housing 18, and additional pipe clamping members 22 for operative association with the additional pipe 23. In FIG. 3, the conduit member 16B is provided with additional internal wall thickenings 16A at those positions at which the rate of attrition or abrasion is the highest, the respective wall thickenings being provided either during the molding of the conduit member, or, subsequent thereto.

While in each of FIGS. 1, 2 and 3 the coupling member halves include pipe clamping members 22 for association with grooved pipes, the respective clamping member halves easily can be adapted to universal application to both grooved pipes and ungrooved pipes in the manner illustrated in FIGS. 4 and 5.

In FIGS. 4 and 5 there are shown alternative forms of pipe clamping members, the clamping member of FIG. 4 being adapted to grooved metal pipes, and the clamping member of FIG. 5 being adapted to pipes having plain or ungrooved ends.

In FIGS. 4 and 5 the clamping member halves are provided with an additional internal housing preferably with an inclined roof 28 in which are received clamping elements or jaws 24 or 25 of hardened steel, such as chrome steel which preferably is zinc plated to enhance its resistance to corrosion. In the case of a grooved pipe as shown in FIG. 4, the clamping elements extend into the groove and provide a rigid interlock between the pipe 12 and the coupling member halves 14. In the case of the plain-ended pipe shown in FIG. 5, the clamping elements are provided at their radially inner periphery with incissors 26, which, upon clamping of the coupling member halves to each other, bite into the metal of the pipe 12 to provide the required rigid interlock. Preferably the upper surface of the clamping elements is inclined to match the incline of the roof 28. These combine to provide an inclined bearing which forces deeper engagement of the pipe as pressure increases.

As will be readily appreciated, various modifications of the shape of the coupling member assemblies illustrated in the drawings can be made to accommodate specific requirements, and, various materials other than the ones specifically referred to in the description may be employed in the fabrication of the coupling member assembly, provided that they meet the requirement of abrasion resistance in the case of the conduit member and rigidity and dimensional stability in the case of the coupling member halves. All such modifications are to be considered as being included within the invention of the present application as defined in the appended claims.

What I claim is:

1. A support for a conduit member formed from a mechanically weak, relatively inexpensive material having a high resistance to abrasion or attrition by particulate abrasive material, said support comprising plural coupling member sections formed from a material of high mechanical strength, said coupling member sections having complementary longitudinally extending faces permitting assembly of said coupling member sections into a unitary coupling member having a central passage for containing said conduit member, first extensions of said coupling member sections at each of the ends of said central passage, said first extensions each defining a gasket housing portion, and second extensions of said coupling member sections contiguous with said first extensions, said second extensions each defining a pipe clamp element.

2. The support of claim 1, further comprising a gasket member located and secured within each said gasket housing portion for operative cooperation with a conduit member and a pipe end upon assembly of said coupling member sections.

3. The support of claim 1, further comprising portions of said second extensions for reception within a circumferential groove of a grooved pipe end.

4. The support of claim 1, further comprising clamping jaws carried by said second extensions for clamping engagement with an outer surface of a pipe end.

5. The support of claim 1, further comprising clamping jaws carried by said second extensions for reception within a circumferential groove of a grooved pipe end.

6. The support of claim 1, further comprising members integral with each said coupling member section permitting securing of said respective coupling member sections to each other in rigidly assembled relationship.

7. In combination, a coupling member assembly comprising plural coupling member sections formed from a material of high mechanical strength and which have complementary longitudinally extending faces permitted assembly of the coupling member sections into a unitary coupling member having a central passage, first extensions of said coupling member sections at each of the ends of said central passage, said first extensions each defining a gasket housing portion, second extensions of said coupling member sections contiguous with said first extensions, said second extensions each defining a pipe clamping element, a conduit member positioned within said central passage, said conduit member being formed from a mechanically weak and relatively inexpensive material having high resistance to abrasion or attrition by abrasive particulate material, ends of said conduit member located within said first extensions, and gasket members positioned within said first extensions and sealingly engaged with said conduit member ends.

8. The combination of claim 7, further comprising localized thickenings in the wall of said conduit member, said conduit member being engaged throughout its entire external surface by inwardly presented surfaces of said coupling member sections.

9. A quick-connect and disconnect coupling for conduits, particularly for conduits used for conveying particulate abrasive material entrained in a fluid medium, said coupling being comprised by separable rigid coupling member halves having cooperating axially extending faces, said coupling member halves defining a central passage and defining a gasket housing at each of the ends of said central passage and further defining pipe clamping members formed by extensions of said coupling member halves at each end of said central passage, detachable means securing said respective coupling member halves to each other in rigidly assembled relationship, a conduit member formed of an abrasion resistant plastics materials contained within said rigid coupling member halves and which has an exterior surface contacted and supported by said rigid coupling member halves throughout substantially the entire extent of the outer surface of said conduit member, and, gasket members contained within said gasket housing portions and engaged with said conduit in sealing relationship therewith.

10. The coupling of claim 9, further comprising localized thickenings in the wall of said conduit member.

* * * * *